United States Patent [19]

Isa et al.

[11] 4,006,199
[45] Feb. 1, 1977

[54] METHOD FOR PREPARATION OF LIQUID POLYOLEFIN OIL

[75] Inventors: Hiroshi Isa, Yachiyo; Hiroshi Mandai, Chiba; Toshiyuki Ukigai, Yachiyo; Anri Tominaga, Tokyo; Tatsuji Yamashita, Chiba, all of Japan

[73] Assignee: Lion Fat & Oil Co., Ltd., Tokyo, Japan

[22] Filed: Apr. 15, 1976

[21] Appl. No.: 677,158

[30] Foreign Application Priority Data

Apr. 22, 1975 Japan .............................. 50-49004

[52] U.S. Cl. ....................................... 260/683.15 B
[51] Int. Cl.² ............................................ C07C 3/18
[58] Field of Search .......... 260/683.15 B, 683.15 D

[56] References Cited

UNITED STATES PATENTS

| 3,947,509 | 3/1976 | Isa et al. | 260/683.15 B |
| 3,952,071 | 4/1976 | Isa et al. | 260/683.15 B |

Primary Examiner—C. Davis
Attorney, Agent, or Firm—Woodhams, Blanchard and Flynn

[57] ABSTRACT

Liquid polyolefin oil having a kinematic viscosity of about 500 centistokes or more at 100° F, a high viscosity index, a good shearing stability and a low pour point can be prepared by polymerizing an olefin having 6 or more carbon atoms in the presence of a catalyst mixture of (a) a dicarbonyl compound selected from a group consisting of acyclic or cyclic diketones and ketoesters and (b) an aluminum halide in an amount of 0.7 – 5 mole per one carbonyl group or ester bond of said dicarbonyl compound. Said catalyst mixture may contain an alkyl halide.

6 Claims, No Drawings

METHOD FOR PREPARATION OF LIQUID POLYOLEFIN OIL

This invention relates to methods for preparing liquid polyolefin oils having a high viscosity, and particularly relates to methods for preparing liquid polyolefin oils having a kinematic voscosity of about 500 centistokes or more at 100° F, a good stability for shearing, a low pour point and a high viscosity index by polymerizing an olefin having 6 or more carbon atoms in the presence of a catalyst mixture of a dicarbonyl compound and an aluminum halide or a catalyst mixture of a dicarbonyl compound, an aluminum halide and an alkyl halide.

Although the art of manufacturing high viscous lubricants from mineral oils has achieved steady advance, lubricating oil which has hitherto been obtained industrially has a kinematic viscosity at 100° F of 450 centistokes at most. It is, therefore, usual to add, as a thickner, such low molecular weight polyolefin as polyisobutene to petroleum lubricating oils so that there is obtained a high viscous lubricant suitable for use as a gear oil, a grease base oil, s refrigerating machine oil and a spinning oil for tyre cords. However, high viscous lubricants thus obtained are inferior in stability for shearing and viscosity index and have a high pour point. Under these circumstances, it has been watched to prepare a synthetic lubricating oil, in place of a petroleum lubricating oil, from polymerization of olefins.

As a method for polymerization of olefins, the cationic polymerization method employing Lewis acids such as aluminum chloride has been known for a long time. According to this method, however, there can be obtained only polyolefin oils having a kinematic voscosity of 400 centistokes at 100° F at the highest. The polymerization method employing alcohols or organic acids as a co-catalyst together with aluminum chloride and effecting at a lower temperature can produce polyolefin oils having a kinematic voscosity of no more than 500 centistokes at 100° F at most.

There has been proposed in Japanese Patent Publication No. 3804/1969 a method of effecting polymerization of olefins in the presence of a liquid catalyst prepared by dissolving excess of aluminum halide in a complex consisting of aluminum halide and ethyl acetate at the molar ratio of 1:1. However, inasmuch as said complex does not act as a catalyst, the effect of this method is no more than cationic polymerization employing the aluminum halide added in excess. Therefore, even by this method employing a complex, there can be obtained only a polyolefin oil having a kinematic viscosity of about 350 centistokes.

More recently, in the art of polymerization of olefins the coordinated anionic polymerization method wherein Ziegler catalyst composed of an organo aluminium and a titanium tetrachloride is used has been highlighted. According to this method, there can prepare polyolefin oil having a high viscosity provide wherein the atomic ratio of aluminium to titanium contained in the catalyst is controlled appropriately. However, this method is defective in that it is difficult to control said atomic ratio of Al to Ti and that the polyolefin oil obtained thereby has a poor stability for shearing. It is, therefore, to be said that this coordinated anionic polymerization method is not applicable to preparation of lubricating oils.

SUMMARY OF THE INVENTION

The inventors have been discovered that a high viscous liquid polyolefin oil having a high viscosity index can be obtained by polymerizing an olefin having 6 or more carbon atoms in the presence of a catalyst mixture of a dicarbonyl compound and an aluminum halide.

Accordingly, the present invention provides a method for preparation of a high viscous polyolefin which comprises polymerizing an olefin having 6 or more carbon atoms in the presence of a catalyst mixture of (a) a dicarbonyl compound selected from the group consisting of acyclic or cyclic diketones and ketoesters and (b) an aluminum halide in an amount of 0.7 to 5 mole per one carbonyl group or ester bond of said dicarbonyl compound and recovering a high viscous polyolefin from the polymerization reaction mixture. The polymerization method of the present invention may also be effected in the presence of a catalyst mixture of the above (a) and (b) ingredients and (c) an alkyl halide.

According to the polymerization method of the present invention, there is obtained a liquid polyolefin oil having properties including good stability for shearing, a kinematic viscosity of more than about 500 centistokes at 100° F, a viscosity index of more than 160 and a pour point of less than -30° C.

The essential feature of the present invention lies in the catalyst employed in the polymerization reaction. Among the ingredients of the polymerization catalyst of the present invention, a dicarbonyl compound, (a) ingredient, includes acethyl acetone, 1,2-cyclopentane-dione, 1,3-cyclopentane-dione, 1,2-cyclohexane-dione, 1,3-cyclohexane-dione, ethyl acetoacetate, phenyl acetoacetate and the like. An aluminum halide which constitutes (b) ingredient of the catalyst includes aluminum fluoride, aluminum chloride, aluminum bromide and aluminum iodide, among which aluminum chloride is preferable. The amount of said aluminum halide to be used is required to be in the range of from 0.7 to 5 mole per one carbonyl group or ester bond of said dicarbonyl compound. When the amount of aluminum halide is less than this, smooth progress of the polymerization reaction cannot be expected and also the yield extremely decreases. On the other hand, the use of aluminum halide in an amount of more than the above range has the disadvantage that there cannot be obtained the intended polyolefin oil because the cationic polymerization will occur preferentially due to the catalytically action of the aluminum halide alone. The appropriate ratio of the aluminum halide to the dicarbonyl compound is in the range of 0.8 to 2.0 mole of the aluminum halide per one carbonyl group or ester bond of the dicarbonyl compound. The amount of the aluminum halide is in the range of 0.5 to 12 mol.%, preferably 2 to 8 mol.% bond on the olefin.

As already stated, the polymerization method of the present invention includes the use of a catalyst mixture containing an alkyl halide as a third ingredient in addition to the dicarbonyl compound and the aluminum halide. By the use of this trinary catalyst it is possible to obtain more viscous polyolefin oil than the polyolefin oil obtained by the use of the binary catalyst of the dicarbonyl compound and the aluminum halide without sacrifice of the lubricating properties such as the stability for shearing, the pour point and the viscosity index, etc. The alkyl halide to be used as a third ingredient of the catalyst includes methyl chloride, 1,2-dichloroethane, tetrafluoroethane and the like. The amount of the alkyl halide is in the range of more than 5 mole per one mole of the aluminum halide employed.

The starting material olefin for use in the present invention is an alpha-olefin or an internal olefin, each having 6 or more carbon atoms. For example, hexene-1, octene-1, 2-ethyl octene-1, tridecene-3, octadecene-2, etc. are useful for the starting olefin. The mixture of these olefins can be used as the starting olefin.

The reaction temperature, strictly speaking, varies with the kind of the dicarbonyl compound employed, the ratio of the aluminum halide to the dicarbonyl compound and the intended properties, particularly the viscosity of the polyolefin oil to be produced, but it is generally in the range of -20° to 100° C, preferably 0° to 60° C.

The polymerization method of the present invention can be practiced even in the absence of solvent. But a solvent may be used for the purpose of facilitating the control of the reaction temperature. The solvent for this purpose can be illustrated by n-pentane, iso-octane, cyclohexane, decane, benzene, xylene, etc. The appropriate amount of the solvent for use in this case is in the range of 25 to 200% by volume, based on the starting olefin.

At present, the reason why there is obtained a synthetic lubricating oil having excellent properties according to the present invention is not clarified scientifically yet. However, it is presumed that the complex catalyst composed of the dicarbonyl compound and the aluminum halide performs the particular action upon the polymerization of the olefins.

The polymerization product per se of the present invention may be used for a lubricating oil. If it is desired to improve the oxidation stability and (or the thermal stability of the product, it can be easily effected by subjecting the product to the hydrogenation treatment by the use of a hydrogenation catalyst such as Raney nickel, nickel on Silica, Alumina, etc.

As will be understood from the foregoing elucidation, according to the polymerization method of the present invention, it is possible to prepare a polyolefin oil having a good stability for shearing, a pour point of less than -30° C, a high viscosity and a high viscosity index. The polyolefin oil of the present invention exceeds the petroleum lubricating oil in the lubricating properties, so that the polyolefin oil of the present invention is qualified for use as a gear oil, a grease base oil, a refrigerating machine oil and the like.

DESCRIPTION OF THE PREFERRED EMBODIMENTS

In a 1000 ml glass autoclave equipped with a stirrer, aluminum chloride, a dicarbonyl compound and an alkyl halide were charged and mixed. Then, to the resulting mixture the starting olefin was added gradually while maintaining the mixture at a prescribed temperature. The reaction was effected for 4 hours. The kind and the amount of the olefin employed, the reaction temperature, the amount of aluminum chloride and the kind and the amount of the dicarbonyl compound as well as the alkyl halide are shown in Table I.

Table I

| Run No. | Olefin (g) | Conditions for Polymerization | | | Molar ratio of 2(a)/(b) | Alkyl halide (g) |
|---|---|---|---|---|---|---|
| | | Reaction Temp. (° C) | $^{(a)}$AlCl$_3$ (g) | $^{(b)}$Dicarbonyl compound (g) | | |
| 1* | dodecene-1 600 g | 20 | 19.0 | acetyl acetone 14.2 g | 0.5 | — |
| 2 | " | " | " | acetyl acetone 8.9 g | 0.8 | — |
| 3 | " | " | " | acetyl acetone 7.1 g | 1.0 | — |
| 4 | " | " | " | acetyl acetone 3.6 g | 2.0 | — |
| 5* | " | " | " | acetyl acetone 1.0 g | 7.0 | — |
| 6 | " | " | " | ethyl acetoacetate 9.3 g | 1.0 | — |
| 7 | " | " | " | 1,2-cyclohexane-dione 8.0 g | " | — |
| 8 | " | " | " | 1,3-cyclohexane-dione 8.0 g | " | — |
| 9 | " | 60 | " | acetyl acetone 7.1 g | " | — |
| 10 | " | 20 | " | acetyl acetone 7.1 g | " | 1,2-dichloroethane 36 g |
| 11 | hexene-1 300 g | " | " | acetyl acetone 7.1 g | " | — |
| 12 | tetradecene-1 700 g | " | " | acetyl acetone 7.1 g | " | — |

(Remarks)
*represents a run for reference purpose.

After completion of the reaction, ammonia gas was blown into the polymerization product to inactivate the catalyst and the product was recovered by filtering out the catalyst. Then, the product polymer was evaluated with respect to the yield, the kinematic viscosity at 100° F, the viscosity index (V.I.E.), the pour point (p.p.) and the stability for shearing. The evaluation of the pour point depends on the method for measuring pour point of petroleum product stipulated in Japanese Industrial Standard K 2269. The evaluation of the stability for shearing consists of measuring the lowering rate of the kinematic viscosity at 100° F of the sample which had been flooded by supersonic wave having a frequency of 10 KC and an amplitude of 31 $\mu$ for 40 minutes. The results are given in Table II.

Further, 500 g each of the respective product polymers obtained in these runs were subjected to the hydrogenation treatment under a hydrogen pressure of 10 Kg/cm$^2$ for 3 hours in the presence of 15 g of Raney nickel catalyst to obtained a hydrogenated oil. The viscosity, viscosity index, pour point and stability for shearing of the respective hydrogenated oils are set forth in Table II.

Table II

| Run No. | Yield (%) | Polyolefin Oil | | | | Hydrogenated Oil | | | |
|---|---|---|---|---|---|---|---|---|---|
| | | Viscosity (c.s.) | V.I.E. | p.p. (°C) | Stability for shearing (%) | Viscosity (c.s.) | V.I.E. | p.p. (°C) | Stability for shearing (%) |
| 1* | 18 | 225 | 145 | −40.0 | 0.2 | 253 | 145 | −40.0 | 0.2 |
| 2 | 53 | 525 | 166 | −35 | 0.2 | 526 | 166 | −35 | 0.2 |
| 3 | 95 | 1051 | 177 | −30 | 0.3 | 1052 | 176 | −30 | 0.3 |
| 4 | 99 | 1120 | 178 | −30 | 0.3 | 1120 | 178 | −30 | 0.3 |
| 5* | 93 | 381 | 151 | −37.5 | 0.2 | 382 | 151 | −37.5 | 0.2 |
| 6 | 99 | 483 | 162 | −35 | 0.2 | 485 | 163 | −35 | 0.2 |
| 7 | 98 | 1213 | 179 | −30 | 0.3 | 1213 | 179 | −30 | 0.2 |
| 8 | 99 | 1310 | 182 | −30 | 0.3 | 1310 | 182 | −30 | 0.3 |
| 9 | 99 | 1074 | 177 | −30 | 0.3 | 1075 | 177 | −30 | 0.3 |
| 10 | 99 | 1420 | 181 | −30 | 0.3 | 1420 | 181 | −30 | 0.3 |
| 11 | 99 | 2820 | 129 | −25 | 0.3 | 2820 | 129 | −25 | 0.3 |
| 12 | 99 | 1009 | 185 | −27.5 | 0.2 | 1010 | 185 | −27.5 | 0.2 |

(Remarks)
*represents a run for reference purpose.

What is claimed is:

1. A method of preparing a liquid polyolefin oil, which comprises polymerizing at a temperature of from -20° to 100° C, an olefin or a mixture of olefins having 6 or more carbon atoms, in the presence of a catalyst mixture of (a) a dicarbonyl compound selected from the group consisting of acyclic or cyclic diketones and ketoesters and (b) an aluminum halide in an amount of from 0.7 to 5 mole per one carbonyl group or ester bond of said dicarbonyl compound, and recovering a liquid polyolefin oil from the polymerization reaction mixture.

2. A method according to claim 1, wherein said dicarbonyl compound is selected from the group consisting of acetyl acetone, 1,2-cyclopentane-dione, 1,3-cyclopentane-dione, 1,2-cyclohexane-dione, 1,3-cyclohexane-dione, ethyl acetoacetate and phenyl acetoacetate.

3. A method according to claim 1, wherein said catalyst mixture contains an alkyl halide in an amount of more than 5 mole per one mole of the aluminum halide.

4. A method according to claim 3, wherein said alkyl halide is selected from the group consisting of methyl chloride, 1,2-dichloroethane and tetrafluoroethane.

5. A method according to claim 1, wherein the amount of the aluminum halide contained in said catalyst mixture is in the range of 0.8 to 2.0 mole of aluminum halide per one carbonyl group or ester bond of said dicarbonyl compound and in the range of 0.5–12 mol.%, based on said olefin.

6. A method according to claim 1, wherein said polymerization is effected in a solvent selected from the group consisting of n-pentane, iso-octane, cyclohexane, decane, benzene and xylene in an amount of 25 to 200% by volume, based on said olefin.

* * * * *